324-77 CROSS REFERENCE SEARCH ROOM

DANIEL SILVERMAN
INVENTOR.

BY Paul F. Hawley

ATTORNEY.

DANIEL SILVERMAN
INVENTOR.
BY Paul F. Hawley
ATTORNEY.

United States Patent Office 3,432,648

Patented Mar. 11, 1969

3,432,648
CROSS-CORRELATOR
Daniel Silverman, Tulsa, Okla., assignor to Pan American Petroleum Corporation, Tulsa, Okla., a corporation of Delaware

Filed Nov. 9, 1964, Ser. No. 409,859
U.S. Cl. 235—181 15 Claims
Int. Cl. G06g *7/19, 7/18;* G06f *15/34*

ABSTRACT OF THE DISCLOSURE

This invention pertains to methods and apparatus for multiplying together two distinct functions which may be of arbitrary nature. It is particularly useful in the crosscorrelation of two functions. One time function is recorded magnetically on tape on a constant width track and a second time function is prepared with a "displacement-time delay line" and a potentiometer or masking means. Very fine insulated wire is wound on a strip of insulating material to form a wire-wound potentiometer strip, over which is passed a strip of magnetic tape with a time function magnetically recorded. Each turn will generate a voltage representing function; all the voltages generated in all the turns are summed and taken off. These voltages are delayed in time by an amount depending on the spacing of the turns and the velocity of the tape. To correlate, the outputs of each turn are multiplied by the other function by means of a magnetic mask having an appropriate contour. Provision is made for introducing both positive and negative values of the second function by preparing two strips of wire-wound inductors with appropriate directions of turns and connections, and using masks of magnetic material with openings cut in the surface.

This invention pertains to methods and apparatus for multiplying together two distinct functions which may be of arbitrary nature. It is particularly useful in the crosscorrelation of two functions.

It is known that one powerful means for determining the presence of a specified signal in the presence of noise is to multiply point by point the amplitude of the function representing the signal plus noise by the corresponding point by point amplitude of the function representing the specified signal. The sum of all of the products resulting from such multiplication is made. The process is repeated for various time relationships between the two functions. It can be shown theoretically that this sum has a maximum at the point at which the specified signal coincides with the signal in the signal plus noise. This may be put in a different way: if the specified signal be designated $f_1(t)$, (having a total duration T) and the signal plus other components, called noise, be designated as $f_2(t)$, then it is found that the term $$\frac{1}{T}\sum_{t=0}^{t=T} f_1(t)f_2(t) \tag{1}$$

has a maximum at the time when the specified signal is coincident in $f_1(t)$ and $f_2(t)$. The mathematical process resulting in the summation of the multiplied terms is called correlation, or more specifically crosscorrelation. It is found that crosscorrelation is a very powerful tool for locating a signal in the presence of much greater noise than would permit identification of the signal when comparison is made by eye of the plots of $f_1(t)$ and $f_2(t)$. Since the summation $$\frac{1}{T}\sum_{t=0}^{t=T} f_1(t)f_2(t)$$

is inherently a type of integration, it is convenient in crosscorrelation to replace this by $$\frac{1}{T}\int_{t=0}^{t=T} f_1(t)f_2(t)dt \tag{2}$$

Detection of signal in the presence of noise is a modern problem of very definite importance in communication theory and thus in such practical examples as radio communication, telemetering, radar, and seismic prospecting. This invention is described in connection with its application in this last field, but is applicable basically to any crosscorrelation problem.

I have discussed the detection or identification of a reflected seismic wave in seismic geophysical prospecting by the crosscorrelation technique in my U.S. Patent 2,779,428. In that patent it was pointed out that it was desirable to use an arbitrary source of seismic waves which would produce a stress variation in the earth over a considerable period of time. This source signal was then crosscorrelated with the received seismic waves.

The correlation of such signals can be accomplished in several different ways. One way was described in the above identified patent. Another is described in U.S. Patent 2,839,149. Still another is shown in French Patent 1,329,739. In each of these the process which takes place inherently is multiplication of corresponding amplitudes of two functions followed by integration (that is, summing) of the products over a particular time or length of record.

In any such system for identifying a particular signal in the presence of noise, it is not sufficient to obtain the crosscorrelation of the two functions to multiply the two functions and sum the products at only one particular position of the two functions. It is necessary that the multiplication be carried out a number of times as one function is shifted relative to the other. Thus, for example, if the functions are functions of time, one must shift the functions relative to each other through various finite time differences $\tau$. Thus expression (2) should be replaced by $$\frac{1}{T}\int_{t=0}^{t=T} f_1(t)f_2(t+\tau)dt \tag{3}$$

$\tau$ may have both positive and negative values. Then the integrations are compared. The integrals will have different values as a function of $\tau$. The value of $\tau$ for the maximum value of the integral corresponds to the location of the one function in that of the other.

Ordinarily, crosscorrelation is a tedious process. When records are large in number, as in seismic surveying for example, the crosscorrelation technique may be very time consuming. It is accordingly desirable to calculate the crosscorrelation function or its equivalent as rapidly as possible.

I have devised a method and apparatus for carrying out the repeated crosscorrelation as rapidly as or more rapidly than the original records can be obtained.

It is the object of this invention to supply a method and means for rapid production of an output directly related to the crosscorrelation of two functions.

This disclosure is illustrated by the attached drawings in which.

One time function is recorded by conventional magnetic tape recording means as a magnetic track on the tape 11. In other words the magnetic field intensity either longitudinally or transversely has been adjusted in direct proportion to the one time function. The magnetic track is of definite finite width which is of course less than the width of the tape. When this tape 11 is moved at substantially uniform velocity past a single turn of wire such that the magnetic field from the tape couples with the turn, a voltage is generated in the turn directly related to the tape speed and to the flux density or field intensity impressed on the magnetic track.

An elongated pickup coil 12 is provided. Unlike conventional pickup coils, this is a helix and contains a substantially uniform linear winding, that is, the turns per unit length along coil 12 are substantially the same throughout its axial length W. The length W is directly related to the velocity $v$ at which the magnetic tape 11 moves and the desired total correlation time T (see expression (2)) by the relation $$W = v.T \tag{4}$$

This establishes a length scale from which a corresponding time scale on the magnetic tape can be determined.

Figures 1, 2:
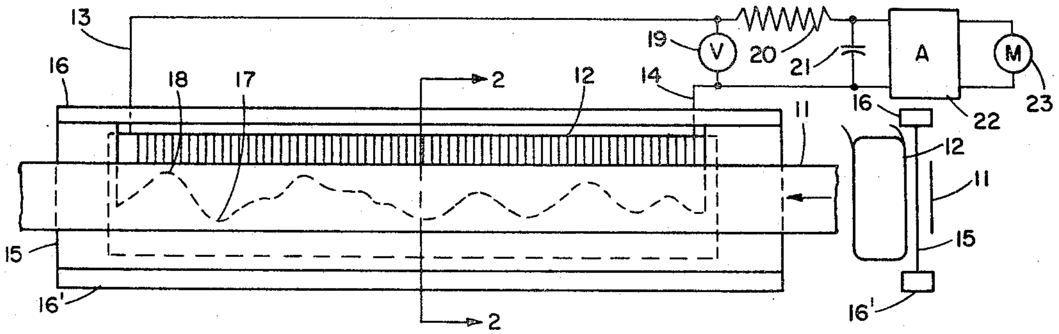
FIGURE 1 shows in diagrammatic view one simple embodiment of this invention.
FIGURE 2 is a cross-section along the line 2—2 of FIGURE 1.

At least one side of this elongated helical pickup coil 12 is perferably, though not necessarily, flat (in a single plane) and wider than the width of the magnetic track on tape 11. Suitable mechanical tracking arrangements well-known in the recording art are arranged to transport the tape 11 in a plane parallel to the plane of the flat side of the coil 12 already referred to and substantially parallel to the axis of the coil or perpendicular to the winding of the coil, as shown in FIGURE 1. Accordingly, when tape 11 is moved at constant velocity $v$ close to and parallel to the flat side of coil 12, the magnetic field due to the function impressed on the magnetic track of the tape couples with the turns of the conductor on the elongated coil 12 and produces a voltage. The generated voltage in each turn is, due to the series relationship of the turns in the coil, summed up algebraically from one end of the coil to the other, that is between terminals 13 and 14. Accordingly, the total voltage output is the integral of the generated voltage from one end of the coil to the other, i.e., over the time T already defined by the time-velocity scale relationships given by Equation 4. The voltage generated in each single turn along the flat side of coil 12 depends on three factors. One is the velocity of the tape, which is maintained essentially constant and, therefore, is simply a scale factor. The second is the magnetic field intensity of the track, which varies directly with the function that was recorded. The third is the magnetic reluctance from the tape through each single turn of wire and back to the tape. If no special provision were made, this reluctance would be identical for each turn along the coil 12 as long as the magnetic tape is maintained essentially parallel to the flat coil side and as long as the individual turns of the coil have essentially the same shape. However, I provide means for modifying this magnetic reluctance of the paths for magnetic flux linking the various turns of coil 12 along the axis of said coil (i.e. along a line parallel to the direction of movement of tape 11) essentially in proportion to the second of the functions which are to be crosscorrelated. In other words, when the field intensity impressed on tape 11 is essentially constant, this means for modifying the magnetic reluctance of the path coupling each individual turn of the flat coil side causes the resultant magnetic flux threading the individual turns from one end of the coil to the other to be essentially directly proportional to the second function to be crosscorrelated.

This is the gist of the arrangement.

There are numerous ways for modifying the magnetic reluctance of the individual paths. For example, one can place immediately adjacent the flat side of coil 12 (that is, either inside or outside this flat coil side) what I term a magnetic mask. This is an essentially uniformly thin plate of material which has the contour of the second function on a length scale corresponding to the time-velocity scale given by Equation 3. Such a magnetic mask 15 is supported in a suitable holder 16 immediately adjacent the flat side of the coil which is in turn close to tape 11.

In one embodiment of this invention this magnetic mask is made of a thin plate of ferromagnetic material of high permeability. If placed as shown in FIGURES 1 and 2, the high permeability plate shields the flat coil side of coil 12 from the magnetic track on tape 11 in direct proportion to the profile. Accordingly, the magnetic flux coupling the individual turns of coil 12 to the magnetic track exists only where the mask 15 is absent. Thus the voltage generated per turn at point 17 for a uniform magnetization of the magnetic track on tape 11 is high, while that at point 18 is correspondingly low. Since the magnetic mask is interposed between the flat side of coil 12 and tape 11, it is apparent that the generated voltage in the turns of coil 12 will be directly related to the profile of the magnetic mask 15.

If, on the other hand, the magnetic mask is immediately adjacent the flat coil side but opposite the magnetic tape, i.e., mask 15 is inside coil 12, the high permeability of this material correspondingly increases the coupling between the individual turns of coil 12 at point 18 relative to that at point 17.

With the three elements—coil, magnetic tape, and mask, related as shown in FIGURES 1 and 2, it is apparent that the instantaneous generated voltage at the terminals 13 and 14 of coil 12 will involve the integral over the time T (corresponding to the length W of the coil and of the mask 15) of the profile on the mask 15 times the corresponding magnetic field intensity of the magnetic track of tape 11. Since the voltage generated per turn is the time derivative of the magnetic field intensity of the track on tape 11, the voltage at terminals 13 and 14 is the crosscorrelation at any instant of the time derivative of the crosscorrelation function on the magnetic track of tape 11 and the profile of the magnetic mask 15. One function $f_1(t)$ can be introduced into the mask 15 by convolutions 17, 18 which represent a certain function of time, plotted to a predetermined scale of time per unit length. Also the magnetic tape 11 carrying variations in magnetic intensity of a function $f_2(t)$ is recorded to a predetermined time scale which should be the same scale of time per unit length used in plotting the mask function $f_1(t)$. Thus, the mask length W represents the time duration T of function $f_1(t)$ to the desired time scale. It is also true, as in Equation 4, that $W=v \cdot T$, but the velocity $v$ of the tape is a means for changing the voltage output of the correlator.

Thus it is a useful function and can be indicated by a voltmeter 19 connected across the coil terminals 13 and 14. This may be an indicating voltmeter or a recording voltmeter, oscilloscope, oscillograph, or the like.

I prefer, however, to integrate the voltage generated in the elongated pickup coil 12. There are many integrating circuits for accomplishing this result. The simple one shown in FIGURE 1 consists of a high resistance 20 connected in series with a fixed condenser 21 across the coil terminals 13 and 14. The product RC of the resistance and capacitance of units 20 and 21 is at least as great as T seconds and preferably several times this magnitude. A linear amplifier 22 is connected across condenser 21, the voltage of which is essentially the time integral of the output voltage across the coil 12. A meter 23 is connected across the output of amplifier 22. This meter 23 may be an indicating meter or preferably an oscilloscope or oscillograph. This measures the cross-correlation of the function on the magnetic track 11 times the function profiled on the mask 15 over the length W of the pickup coil, i.e., integrated over a corresponding time given by Equation 3.

In another embodiment of my invention, the magnetic masking effect for modifying the average permeability of the identical length paths from the tape linking each turn of the coil in accordance with the second function to be crosscorrelated is accomplished by making the plate having the profile of the desired function of high conductivity material. As in the first embodiment, this mask is placed adjacent but outside the flat coil side. Movement of the magnetic tape generates eddy currents in the high conductivity plate or mask 15 which substantially cancels the magnetic field beyond the shield due to the tape 11. Accordingly, the magnetic field from the tape will produce generated voltage in the individual turns of wire in pickup coil 12 only where this plate is absent. By profiling the mask in accordance with the second function to be correlated, the magnetic coupling between tape and individual coil turns along the flat side of the coil is made directly proportional to the lack of masking material present and hence directly proportional to the exposed length of each coil turn.

The apparatus thus far described permits crosscorrelation of the function plotted on the magnetic mask with a similar length of function magnetically inscribed on the track of tape 11 to yield an instantaneous output continuously changing as the tape runs by the mask. It is apparent, therefore, that the comparative value of this crosscorrelation function can be prepared for the entire tape in the length of time that it takes to transport the tape at its essentially uniform velocity past the mask and elongated pickup coil. This time, it should be noted, is not even limited by the recording time for the seismic field record on the magnetic track. Thus, one can transport tape 11 at considerably higher velocities than that originally used in recording the magnetic information on this tape, if desired.

It should also be apparent that one can crosscorrelate magnetic tape track with not only the desired signal which may have been used as a seismic source in generating the field tape 11, but one may employ perfectly arbitrary functions, which may be plotted to other scales than the time-velocity scale on the magnetic tape. It simply depends upon what information the operator is interested in crosscorrelating.

Figure 3:
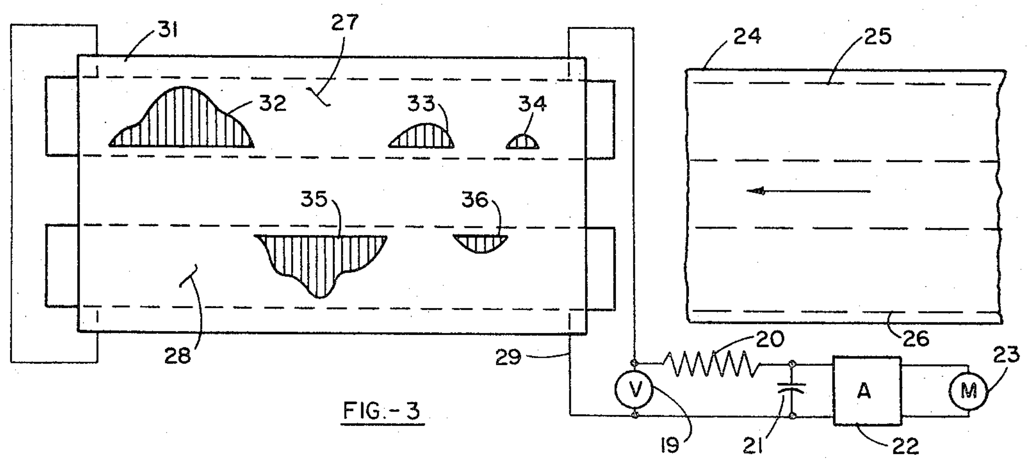
FIGURE 3 represents a modification of the type of apparatus shown in FIGURE 1.

A useful variation in this system is shown in FIGURE 3. The magnetic mask used in FIGURE 1 to vary the coupling of the individual pickup coil turns with respect to the tape obviously gave variations in coupling from a positive maximum to a minimum. No negative values can be represented by this form of magnetic mask. Under ordinary circumstances, this is not important since the signal output at terminals 13 and 14 of coil 12 or the integrated output thereof still contains the crosscorrelation function except for its steady-state term. If, however, one wishes to incorporate even this term, the system is modified into that of FIGURE 3.

Here, a magnetic tape 24 has been provided with two separate, parallel, identical magnetic tracks 25 and 26 containing precisely the same function. In other words, the information in track 25 has been duplicated on track 26. Two elongated pickup coils 27 and 28 are provided. These are made as alike as possible. Both are wound substantially uniformly along the coil axis. Each contains at least one flat side. Each of these flat sides are wider than the magnetic tracks 25 or 26, but not as wide as both tracks. They are maintained on a support (not shown) so that the flat sides are substantially in one plane, and suitable provision (not shown) is made to move the tape close to this plane and transverse to the winding to said coils at substantially uniform velocity. In this way, elongated pickup coil 27 magnetically couples to or is magnetically linked with track 25, and coil 28 with track 26. The two pickup coils are connected in series opposing relationship so that if no magnetic mask were employed, motion of the tape 24 past the pickup coils 27 and 28 would produce zero voltage across the output terminals 29 and 30.

The magnetic mask 31 is essentially identical in all but one aspect to mask 15 of FIGURE 1. This one change lies in the fact that the positive part of the second function which is to be correlated with that on tape 24 is profiled or plotted (in the sense of creating an opening) on the part of the mask adjacent one pickup coil, for example coil 27. The negative part of this second function is similarly profiled on the part of the magnetic mask immediately adjacent the second pickup coil 28. As this arrangement is shown in FIGURE 3, the "windows" 32, 33 and 34 thus represent the plot of the positive part of the second cross-correlation function on a length scale corresponding to the time-velocity scale of the magnetic tape 24, while "windows" 35 and 36 represent on the same length scale the negative part of the second function.

As in the arrangement shown in FIGURES 1 and 2, the output from the two coils 27 and 28 which contain the entire crosscorrelation output are either metered directly by an indicating or recording voltmeter 19 or integrated by resistor 20 and condenser 21, amplified by amplifier 22, and indicated or recorded by output meter 23. The instantaneous polarity across terminals 29 and 30 at each instant determine whether the total cross correlation output is positive or negative and hence contains the steady-state term.

While it is not shown, it is apparent that the single magnetic mask 31 with its profiled function can in fact consist of two masks, each adjacent the common flat side of one of the pickup coils. Since I have found that the magnetic mask may be made of quite thin material (at most a few thousandths of an inch thickness), it is usually found that preparation of a single mask as shown in FIGURE 3 is a more convenient arrangement for rapid line-up of the mask with the two coils.

Figure 4:
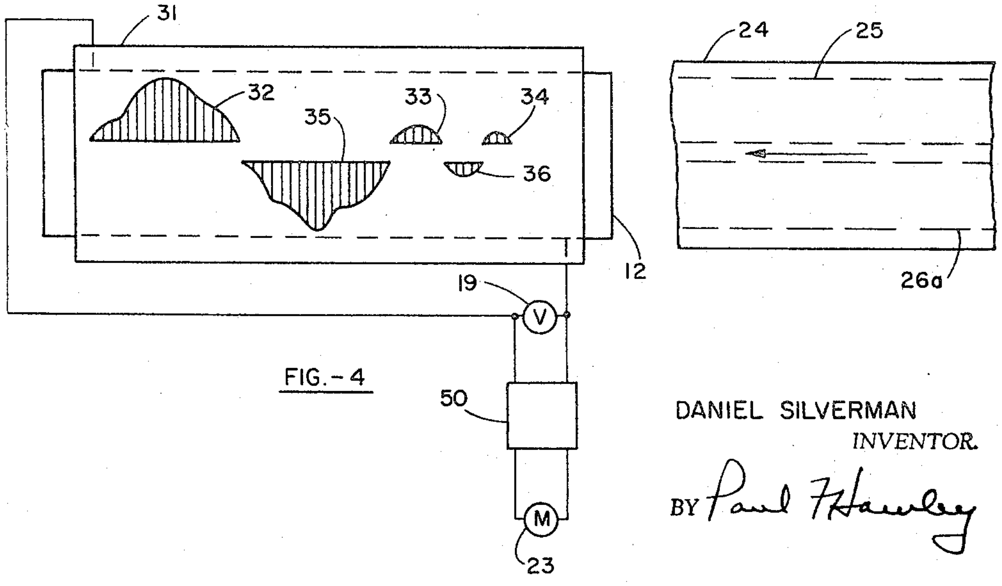
FIGURE 4 illustrates a second form of the invention shown in FIGURE 3.

It is not necessary to use two coils, such as coils 27 and 28, with this embodiment of the invention. FIGURE 4 shows an arrangement permitting use of one single coil which has at least one flat side greater in width than the combined width of the two magnetic tracks on tape 24. The arrangement of the magnetic mask 31 is just like that in FIGURE 3. However, in the preparation of the magnetic tracks on tape 24, opposite signal polarity is used on tracks 25 and 26*a*. With this arrangement, if no magnetic mask 31 were employed, passage of magnetic tape 24 transverse to the linear winding on coil 12 would result in zero output voltage for this coil. However, since mask 31 has been profiled, or plotted, on one part of the mask past which one of the two tracks moves, while the rest of the profiling (the negative part of the second function) is on the part of the magnetic mask past which the second magnetic track 26*a* moves, the output of the coil will represent the entire crosscorrelation of the function on tracks 25 and 26*a* and the function plotted on the mask 31. Thus the voltmeter 19 across the coil terminals produce the same indication as that shown in FIGURE 3, while integrating this voltage with respect to time with integrator 50 will again produce the same integrated output on meter 23 in FIGURE 4 as it did in FIGURE 3.

Figure 5:
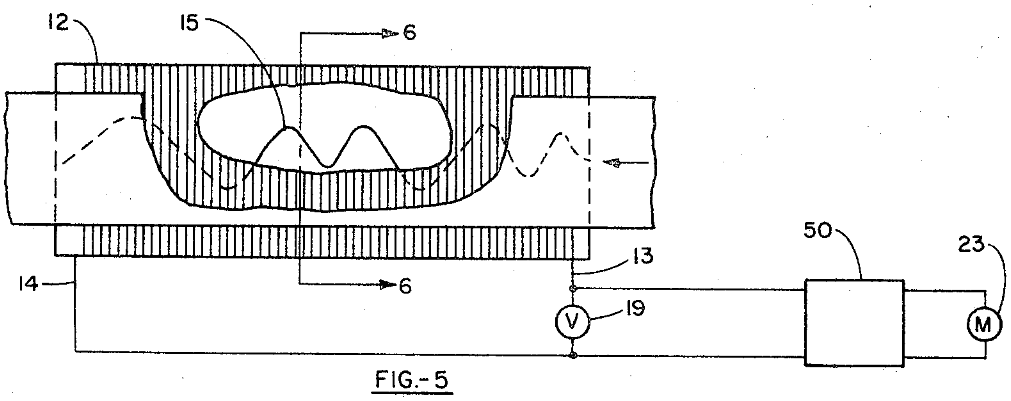
FIGURES 5 and 6 illustrate another embodiment of the invention.
Figures 6, 7, 8:
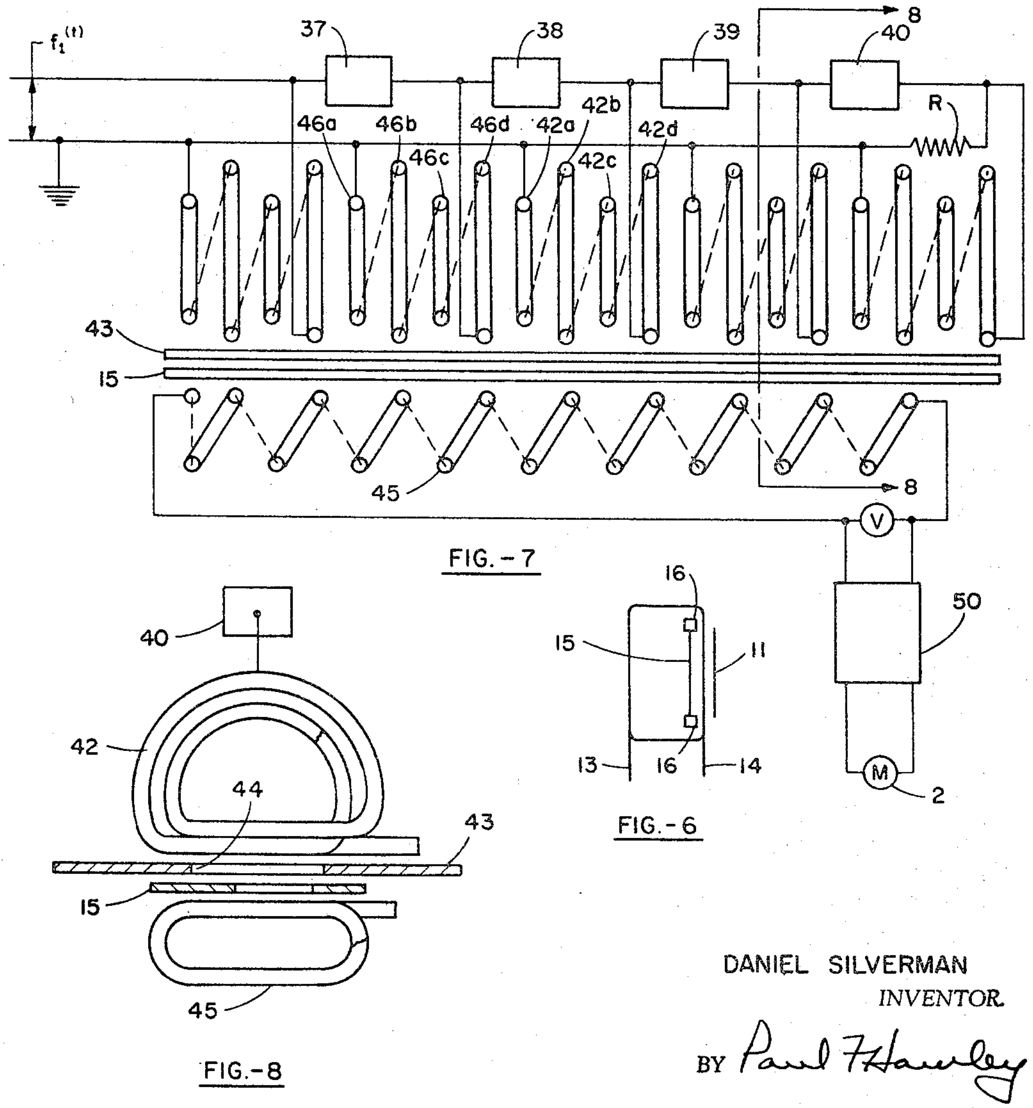
FIGURES 7 and 8 show still another form of this invention.

For completeness, I have shown in FIGURES 5 and 6 an embodiment of the pickup coil and magnetic mask in which the mask is located within the coil. The elongated coil 12 in this case preferably has a larger cross-sectional area, both to decrease coupling of the tape with the back side of each turn of the coil and to facilitate insertion of the mask in the holders 16 and 16′. The profiling of the mask 15 has been already described. If physically no point of the mask engages the slot in the upper holder 16', it is simply necessary to extend the mask with a tab of dielectric sheet long enough to hold the mask in the top slot. In FIGURE 4, incidentally, an integrating amplifier 50 is shown connected across the coil terminals 13 and 14 to emphasize the fact that any type of integrator may be employed across the output. Such functional amplifiers are very well known in this art.

The magnetic mask should be capable of rapid production and should accurately represent the function to be correlated. Many ways of profiling such a mask are available. For example, at present one can obtain thin, highly permeable or highly conductive metal sheets deposited or plated on a thin plastic strip or sheet. One may plot the desired function on such a sheet, or etch such a shape, or burn off the profile by passing current through a fine stylus which is electromagnetically moved back and forth like a rectilinear pen recorder in a procedure very similar to oscillographic recording. Magnetic material in the form of a powder slurried into a drying liquid vehicle can be brushed or printed onto a nonconducting sheet, like inking an India ink solid figure on a sheet of paper. A Xerox-type printing powder can be provided, having highly conductive or highly permeable characteristics and a Xerox print of the mask may be made from a variable area recording made by conventional means. Other ways of preparing these magnetic masks rapidly will be apparent to those using this system.

It is apparent in the embodiments of the invention thus far discussed that the magnetic flux present on the tape is applied sequentially to each of the coil turns in order. However, it is not to be assumed that a mechanical transport of a magnetic signal is the only means of applying the flux sequentially to a multiplicity of inductors. An electrical delay line is a unit having considerable use in presenting a signal atfer a specified time delay. A complete delay line usually consists of a plurality of delay units which are ordinarily comprised of a series of inductances with shunt capacitances, tapped between each unit. The line is normally terminated in its characteristic impedance. Thus, when a signal $f_1(t)$ is impressed across the input to the delay line, a substantially equivalent signal $f_1(t—\alpha)$ appears at the first tap, a signal $f_1(t—2\alpha)$ appears at the second tap, and so on, where $\alpha$ is the time delay through each unit of the delay line. These tapped delay lines are available commercially at the present time with delays up to a total of one second or greater. Such a delay line can be used to present the first function in the correlation in the form of magneic flux to a uniform series of inductors. This is shown in FIGURES 7 and 8. FIGURE 7 is a cross-sectional view along the inductor coil, while FIGURE 8 shows a transverse cross-section. The electrical delay line is shown as being made up of a plurality of equal delay units 37 to 40. This unit is terminated in its characteristic impedance R. A double helix 42 is linearly wound out of sets of few-turn inductors. **42*a* to 42*d* represent, for example, one associated set of turns on one side of this coil. Thus the signal applied to 42*d* is also applied to 42*c*, 42*b*, and 42*a*, producing a magnetic flux in this portion of the helix 42 which is $f_1(t—2\alpha)$. The same situation is found for the other tapped portions of this helix. Accordingly, the signal $f_1(t)$ as it progresses through the delay lines is reproduced in the form of magnetic flux on the consecutive inductors of the helix 42**. There is no need in this case for any mechanical motion of a magnetic tape, or equivalent.

Immediately adjacent the flat side of helix 42 is a first magnetic mask 43 which simply limits the magnetic flux to a central longitudinal slot 44 parallel to the axis of the helix 42. A second magnetic mask 15 contains the profile of the second function to be correlated. The opening in this slot, therefore, permits the traveling function $f_1$ to produce a magnetic flux in a stationary second helix 45 which preferably has one flat coil side immediately adjacent magnetic mask 15. It will be clear that if the tranverse dimension of mask opening 15 is less than that of 44, mask 43 may be dispensed with.

The operation of this embodiment, other than the use of the tapped helix and delay line is precisely as in the other embodiments. The function $f_1$ travels from one end of the helix to the other, producing a magnetic field adjacent the turns of helix 42 just as the magnetic track on the tape 11 produces such a magnetic field in the embodiment of FIGURE 1. The combined flux passing through slot 44 is modified in direct proportion to the slot in mask 15 and, accordingly, is modified by the second function. A voltage directly proportional to the modified flux is generated in the coil 45 and appears across the voltmeter 19 or, if desired, is integrated by integrator unit 50 to appear on the output meter 23, as described in connection with FIGURE 1. Here, again, the output of the meter 23 is an indication at each instant of the crosscorrelation of the second function on mask 15 with the traveling magnetic wave equivalent to that part of function $f_1(t)$ then present in the helix 42. Placing one turn of the helix **42*a* in the same longitudinal position of one of the turns of the preceding section 46*a* in effect produces a condition of magnetic "overlap" which still further insures that the magnetic flux produced by the inductors of helix 42** are equivalent to $f_1(t)$.

It is also apparent that this system may be employed simultaneously in multiple, that is, a number of signals on magnetic tracks on one or more magnetic tapes can be crosscorrelated at the same time by simply moving the magnetic tracks at the same time over a corresponding plurality of magnetic masks adjacent a corresponding plurality of elongated pickup coils, as described. This again decreases the time required for crosscorrelation of the field tapes.

The coil surface need not be plane, but can be formed in an arc along its length, with the mask and tape fitted to the contour.

It is to be understood that a helix can be formed by other techniques than winding wire on a core. For example, the so-called printed circuit techniques such as coating and etching may be employed to form a multiplicity of substantially parallel, evenly spaced, series-connected inductors.

Reference has been made to the magnetic tape at some length. It is recognized that an equivalent arrangement of producing a reproducible signal is by use of a thin magnetizable film on the surface of a drum, disc, or the like. Such an arrangement can be employed in my invention. In this case the axis of the pickup coil is not straight but arcuate in the form of an arc of a circle corresponding to the size and shape of the drum or disc. The masks used correspond to the shape of the coil. There is no essential change in the operation of the system.

I claim:

1. Apparatus for correlating together two functions, comprising means for generating an elongated pattern of magnetic flux varying lengthwise in accordance with a first function,
   - a plurality of series-connected inductor elements in a longtiudinal array parallel to said pattern of magnetic flux,
   - means for applying said flux sequentially to said inductor elements at uniform time delays, and
   - means to vary the electromagnetic coupling between said flux and each of said inductors in accordance with a second function.

2. Apparatus for correlating together two functions one of which is in the form of variations in magnetic field intensity along a track on a tape which is parallel to the long dimension of said tape, comprising:
   - an elongated substantially uniformly wound helical pickup coil, with one side of said helix flattened along its length to form a substantially plane surface of width greater than the width of said track,
   - means for moving said tape parallel to the axis of said coil and close to the plane portion thereof, and means for modifying the magnetic reluctance path along the axis of said pickup coil as a function of the second of said two functions, to control the magnetic flux emanating from said tape and linking said pickup coil.

3. Apparatus for correlating together two functions one of which is in the form of variations in magnetic field intensity along a track on and parallel to the long dimension of a tape, comprising:

an elongated substantially uniformly wound pickup coil with at least one side of said coil flattened along its length to form a substantially plane surface of width greater than the width of said track, the turns of said coil being substantially perpendicular to the axis of said coil, means for relatively moving said tape parallel to the axis of and close to said flattened side of said coil, at a uniform velocity, and means for modifying the permeability of the magnetic flux paths from said tape linking at least one turn of said coil, along the axis of said coil essentially in proportion to the second of said two functions.

4. Apparatus for crosscorrelating two functions one of which is in the form of a magnetic signal along a track on and parallel to the long dimension of a magnetic tape comprising:

a substantially uniformly wound elongated helical pickup coil with at least one side of said coil flattened along its length to form a substantially plane surface of width greater than the width of said track, means for moving said tape close to said flat side and parallel to the axis of said coil at substantially uniform velocity to generate a voltage in said coil, said magnetic signal along the track being in inductive relation to the turns of said coil, means adjacent said flat side of said coil for varying the inductive coupling between the magnetic signal on said track and the turns of said coil along the axis of said coil substantially proportional to said second function, and output means connected to the terminals of said pickup coil to indicate the voltage generated.

5. Apparatus in accordance with claim 4 in which said means for varying the coupling comprises a thin sheet magnetic mask the contour of which is directly proportional to said second function plotted to the same time-length scale of said magnetic tape.

6. Apparatus in accordance with claim 5 in which said magnetic mask is made of ferromagnetic material of high permeability.

7. Apparatus in accordance with claim 5 in which said magnetic mask is made of a material of high conductivity.

8. Apparatus in accordance with claim 4 in which said output means includes an integrator, whereby said output indication is directly proportional to the time integral of said generated voltage.

9. Apparatus for crosscorrelating two time functions one of which is in the form of duplicate magnetic signals along two substantially parallel spaced magnetic tracks on and parallel to the long dimension of a magnetic tape, said signals recorded to a predetermined scale of time per unit length of said tracks, comprising:

(1) two duplicate parallel substantially uniformly wound elongated helical pickup coils with at least one side of each of said coils flattened along their lengths to form elongated substantially plane surfaces, of width greater than one but not both of said tracks, said coils being connected in series opposing relationship, and being mounted with said flat sides substantially in one plane, (2) means for moving said tape with said tracks over said coils and close to said plane and parallel to the axes of said coils at substantially uniform velocity, to generate a voltage in said coils, (3) a planar magnetic mask adjacent the flat side of each of said coils and extending axially along the length of said coils, the portion of said mask adjacent one of said two tracks having a contour directly proportional to the positive part of said second function and the portion of said mask adjacent the other of said two tracks having a contour directly proportional to the negative part of said second function, in both cases the contour being plotted to the same scale of time per unit length as said first function, and (4) means connected to the other terminals of said coils for producing an output indication of the generated voltage of both coils in series opposing relationship.

10. Apparatus in accordance with claim 9 in which said means for producing an output indication related to said generated voltage includes an integrator, whereby said output indication is directly proportional substantially to the time integral of said generated voltage.

11. Apparatus for crosscorrelating two functions one of which is in the form of two magnetic signals recorded along two substantially parallel magnetic tracks on and parallel to the long dimension of a tape one signal being of polarity opposite to that of the other signal comprising:

(1) a substantially uniformly wound elongated helical pickup coil with at least one side of said coil flattened along its length to form a substantially plane surface of width greater than the width of both of said tracks, the turns of said helix being substantially perpendicular to the axis of said coil, (2) means for moving said tape with said tracks over said coil and close to said plane surface in a direction along the axis of said coil at substantially uniform velocity, to generate a voltage in said coil, (3) a planar magnetic mask adjacent the flat side of said coil and extending axially along the length of said coil, the portion of said mask adjacent one of said two tracks having a contour directly proportional to the positive part of said second function and the portion of said mask adjacent the other of said two tracks having a contour directly proportional to the negative part of said second function, in both cases the contour being plotted to the time-length scale of said first function on said magnetic tape, and (4) output means connected to the terminals of said pickup coil to indicate the voltage generated.

12. Means for generating a moving pattern of magnetic flux varying longitudinally in accordance with an electric signal function, comprising:

(1) a tapped delay line fed by said electric signal, (2) a plurality of substantially similar inductors serially mounted adjacent each other with substantially uniform spacing to form an elongated coil, and (3) each of said inductors being connected in turn to a corresponding tap on said delay line.

13. Apparatus for correlating two functions comprising:

a tapped delay line fed by an electric signal varying in accordance with said first function, a plurality of substantially similar coil segments serially mounted adjacent each other to form an elongated coil, each segment in turn being connected to a corresponding tap on said delay line, a plurality of equally spaced, series-connected inductor elements in an elongated array adjacent said coil, and means to vary the electromagnetic coupling between said segments and said inductor elements along the length of said inductor array in accordance with a second function.

14. A stationary apparatus for correlating two functions comprising:

a tapped delay line fed by an electric signal function representing the first of said two functions, a plurality of substantially similar coil elements serially mounted adjacent each other to form an elongated coil, each coil element in turn being connected to a corresponding tap on said delay line, an elongated conducting helix of substantially uniform turn spacing placed parallel to and adjacent said coil, a thin sheet magnetic mask, the contour of which is directly proportional to said second function, and said mask being placed between said coil and said helix, whereby the moving flux pattern of said first function of said coil is modified by said mask in accordance with said second function and detected by said helix.

15. Apparatus as in claim 14 in which a second magnetic mask, adapted to limit the magnetic flux from said coil to a region of predetermined width parallel to the axis of said coil is placed between said coil and said helix.

References Cited

UNITED STATES PATENTS

| | | | |
|---|---|---|---|
| 3,038,069 | 6/1962 | Tuller | 235—181 X |
| 3,109,156 | 10/1963 | Anderson | 235—181 X |

MALCOLM A. MORRISON, *Primary Examiner.*

FELIX D. GRUBER, *Assistant Examiner.*

U.S. Cl. X.R.

235—183, 194; 324—77; 333—29